United States Patent [19]
Hoffmann

[11] 3,862,804
[45] Jan. 28, 1975

[54] DOUBLE BEAM REFLECTANCE PHOTOMETER WITH SWITCHING MIRROR

[76] Inventor: Konrad Thanisch Hoffmann, Peter-Bied-Strasse 49, 6230 Frankfurt am Main 80, Germany

[22] Filed: Apr. 25, 1973

[21] Appl. No.: 354,341

[30] Foreign Application Priority Data
May 2, 1972   Germany............................ 2221444

[52] U.S. Cl.................... 356/93, 350/6, 356/212, 356/229, 356/236
[51] Int. Cl.......................... G01j 3/42, G01n 21/48
[58] Field of Search.............................. 356/88–95, 356/217, 218, 229, 236, 212; 350/6

[56] References Cited
UNITED STATES PATENTS

| | | | |
|---|---|---|---|
| 2,992,588 | 7/1961 | Henderson.......................... | 356/236 |
| 3,234,844 | 2/1966 | Fain et al............................. | 350/6 |
| 3,238,368 | 3/1966 | McPherson.......................... | 356/95 |
| 3,540,825 | 11/1970 | Grojean............................... | 356/88 |
| 3,749,497 | 7/1973 | Kuzmin................................ | 356/93 |

*Primary Examiner*—Vincent P. McGraw
*Attorney, Agent, or Firm*—Watts, Hoffmann, Fisher & Heinke Co.

[57] ABSTRACT

An electronic spectrophotometer for measuring the reflectance of colored samples relative to a reference standard. A switching mirror directs light from a monochromator on a sample and a reference standard that are spaced apart. Reflections therefrom fall on a common photoelectric detector and the resultant signals are amplified, separated and indicated as a quotient between sample and standard reflectance.

7 Claims, 5 Drawing Figures

DOUBLE BEAM REFLECTANCE PHOTOMETER WITH SWITCHING MIRROR

This invention relates to electronic spectrophotometers which are utilized in measuring the color content of samples and surfaces and has for its principal objects the provision of an improved device and method of operation, whereby a continous indication of such color content may be made available or whereby one color may be made to match another color, the color of which has been measured before.

Taking in account the high sensitivity of the human eye for small color differences, it is understood that reflection photometers need a very high accuracy and an excellent time constancy of the calibration. Therefore it is common practice to use double beam instruments where the reflection of a sample is measured relative to a reference standard thereby eliminating deviations from normal working conditions by changes in photodetector sensitivity, amplifier gain and so on.

A principal drawback of the known types of reflection photometers is, that the beam switching between standard and sample path is performed by combinations of rotating and fixed mirrors, and the beams in either light paths have to undergo several mirror reflections. As the spectral reflectivity of mirrors is not constant over the wavelength range and is moreover due to changes with time, high precision work affords more or less complicated means for flattening the 100 percent line of the photometers, which not only needs additional costly mechanical or electronic devices but also cumbersome and time consuming calibration work for maintaining the proper working conditions of the instrument.

The present invention is directed to the provision of a novel instrument, which takes advantage of the double beam principle for reflection measurement, thereby eliminating any possible difference in the light intensities in the sample and reference path. This is performed by providing only one mirror which is moreover common for both light beams and by solely inserting one single lens in each of the two beams. As the transmission characteristics of optical lenses are absolutely constant with time, any cause for optical differences is completely eliminated.

In practicing the invention: the light emerging from a monochromator is directed by a special device, called a switching mirror on the sample and the reference standard which are arranged at some distance from the switching mirror and are separated by a small distance from each other. The reflected energies from sample and standard fall on a common photoelectric detector, the signals of which are amplified, separated and indicated in the usual manner as the quotient between sample and standard reflectance.

The invention will be better understood from the following description considered in connection with the accompanying drawings and its scope is indicated by the appended claims.

REFERRING TO THE DRAWINGS

Figure 3:
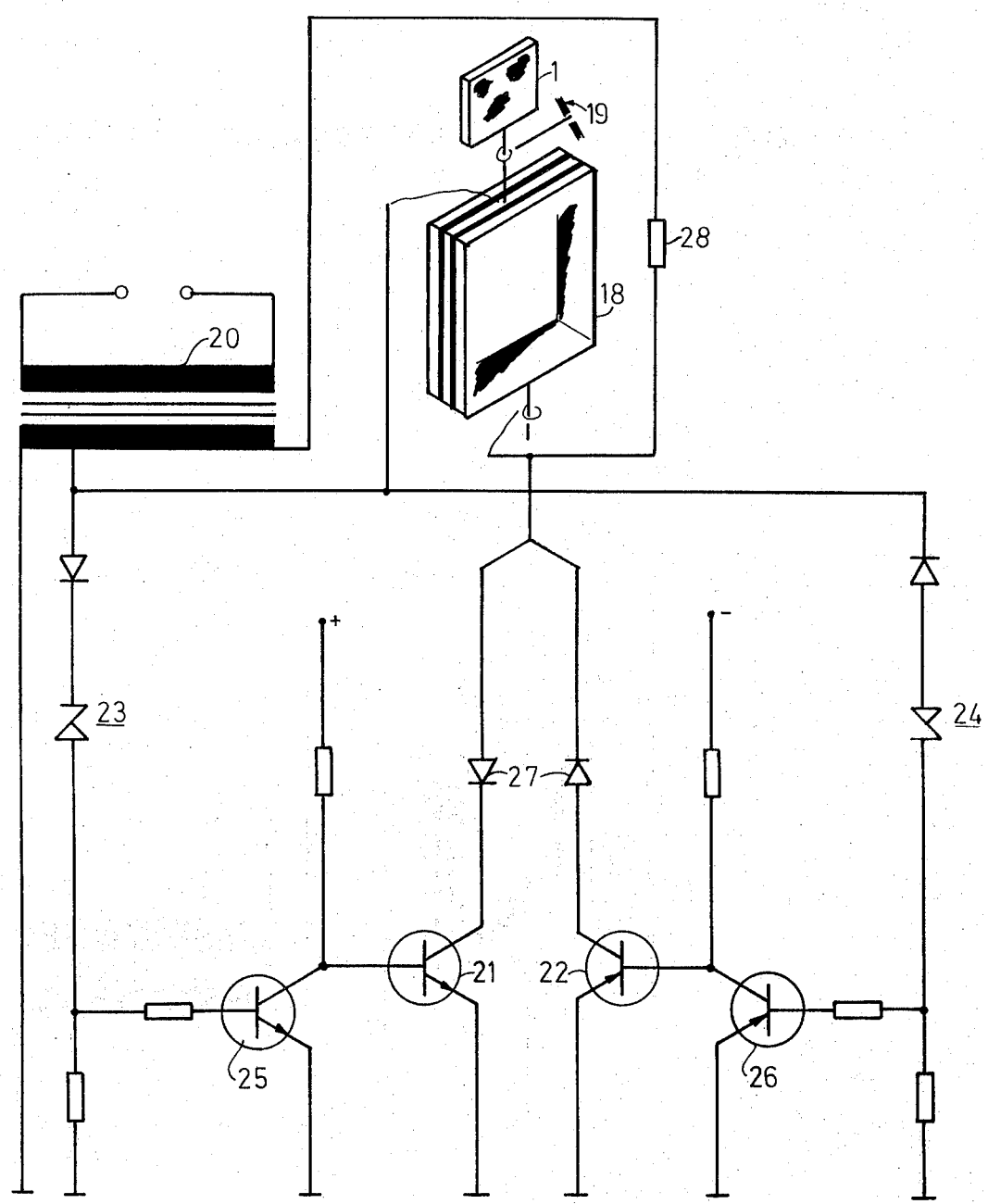

FIG. 3 a view of the mirror drive, consisting of a robust moving coil meter with a low resonant frequency and a diagram of the eletronic circuit.

Figure 4:
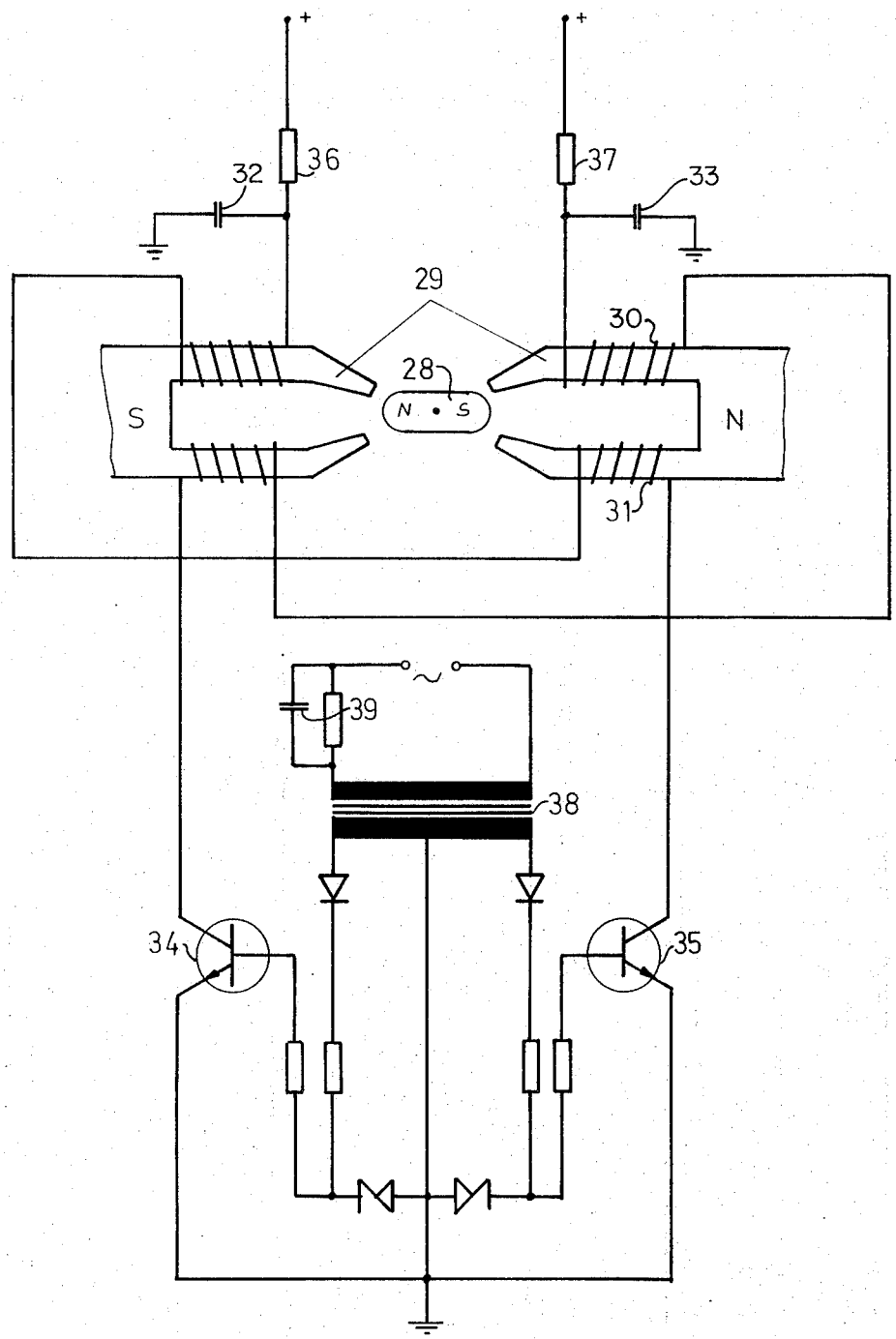

FIG. 4 is a view of the mirror drive, consisting of a high tuned moving-magnet meter and a schematic circuit diagramm.

Figure 5:
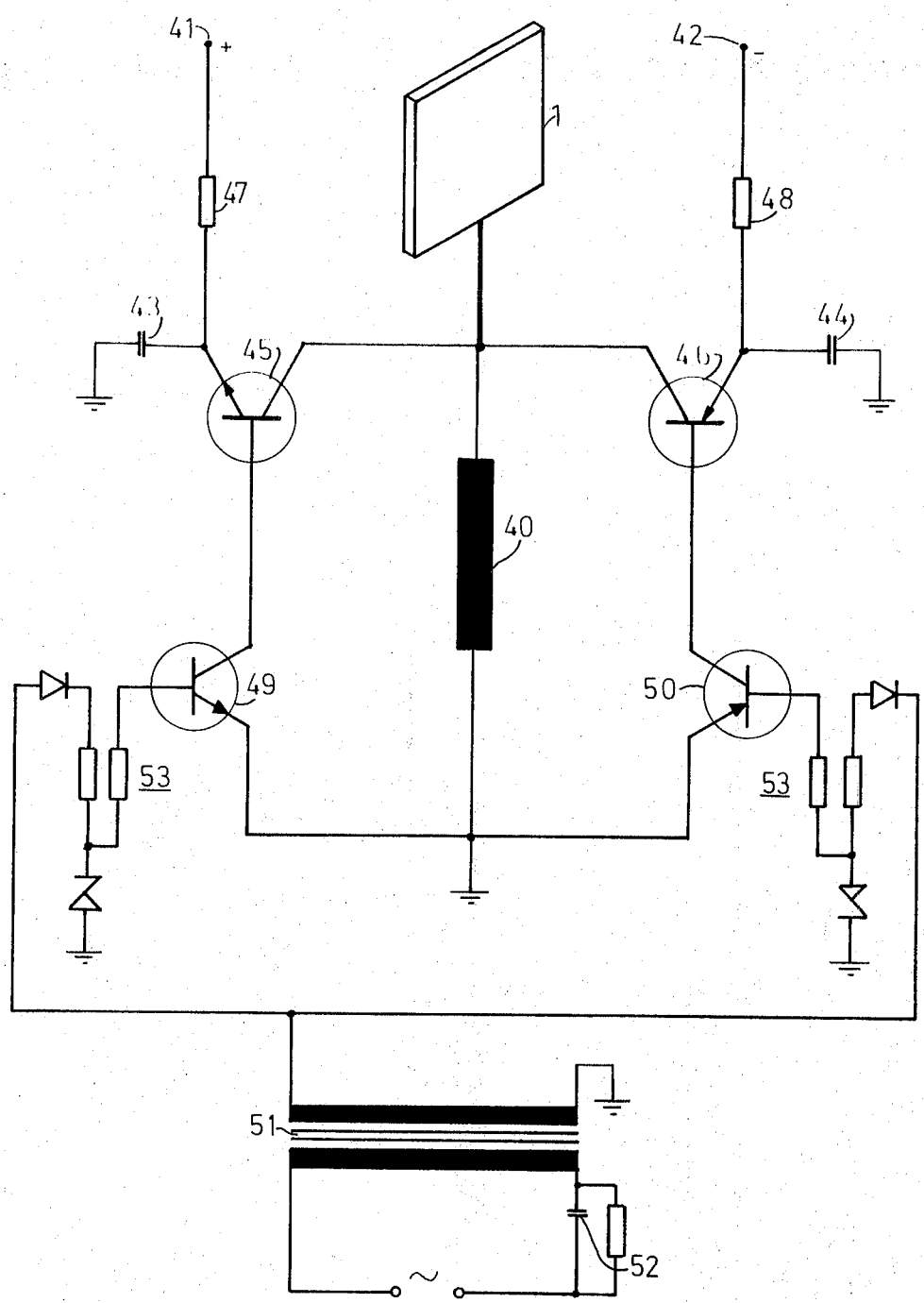

FIG. 5 is a schematic view of the mirror drive, consisting of a high tuned moving-coil meter and the electronic driving circuit.

Figure 1:
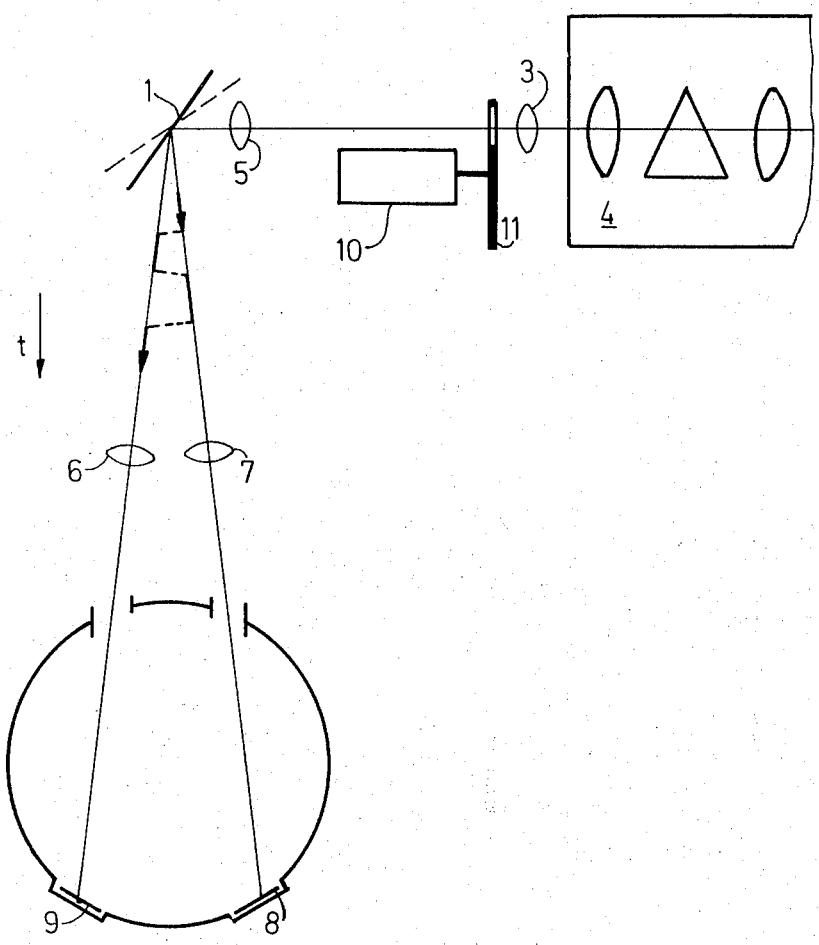
FIG. 1 is a diagrammatic representation of measuring apparatus, incorporating the invention.

In FIG. 1 which incorporates all essential optical and mechanical elements of a reflection photometer incorporating the present invention, (1) is the switching mirror, that directs the common light beam emerging from the monochromator (4) either to the sample (8) or to the reference standard (9) which are spaced by a small distance from one another. Lens (3) near the exit slits of the monochromator (4) produces a diminished image of the collimator in the plane of the switching mirror (1) and which is enlarged in a moderate scale by the double lenses (6) and (7) on sample and reference standard. A further lens (5) is used to complete the optical performance of the system inasmuch as it collimates the light from the exit slit on the double lenses (6) and (7). The diffusely reflected light from sample and standard illuminates the wall of an integrating sphere and falls from there on a photoelectric detector, not shown here. It will be noted, that in the common light path a rotating shutter (11) is inserted, that is driven by motor (10). Shutter disc and switching mirror-drive are phased in such a manner, that the beam is cut-out during the switching times of the mirror.

The special feature of this invention is the manner in which the beam switching is performed. It is known to use mirrors that are tuned to harmonic oscillations. This approach has the drawback that either the beams do not stay at rest during their working positions and that on the other hand the non-usable time intervalls that are needed to reach the working positions of the mirror are relatively long, resulting in a rather poor light economy. It is an essential feature of this invention that the mirror mount and drive is dimensioned in such a manner that the switching times for the light beams are relatively small compared with resting times in both elongations, where the mirror is held at a stand-still.

It is understood that special means, described in the following examples, have to be provided to overcome the inertial forces, which have a disturbing effect on the characteristics of reflection with a desired mirror movement. The switching frequency has to be considerably high to secure a good performance of the whole photometer. It has been found, that switching in synchronism with the AC-line, i.e., 50 or 60 cycles per sec, is a very good choice of frequency. The beam position as a function of time is indicated by the curve right hand of the arrow near the letter t from which it becomes clear, that during most of the time the light falls either in the sample or the reference path and the dotted portion of the curve indicates the switching times from one position to the other.

The reflected light collecting scheme in FIG. 1 comprises an integrating sphere what means that the total diffusely reflected light is collected. The geometry is arranged in such a manner, that the reflected radiation of sample and standard strikes the sphere wall between the two entrance ports. Provisions can be made that allow the reflected light to be included or excluded in the measurements. This feature, not shown here, consists in providing a replaceable cup with white or black surface, to be inserted in the sphere wall between the two entrance ports. Other means could be arranged, consisting of a turnable disc with white and black surfaces backing each other.

Another modification of the invention, not shown here, could be to replace the integrating sphere by a 45 degree geometry whereby the light emitted at an angle of 45 degrees from sample and standard which are oriental normal to the incoming beams is collected by a photoelectric detector. This geometry is sometimes preferred for the color measuring of samples with show high specular gloss as for instance colored plastics, paints, lacquers and prints.

Another modification of the invention, not shown here, could be to replace the monochromator by light filtering means, for example interference or color measuring filters.

A further modification of the invention, not shown here, could be to invert the direction of the light which is practicable for measuring the reflection of fluorescent samples, for instance of optical whiteners or samples dyed with fluorescent dyes or pigments. In this case, the sphere is illuminated by xenon-arc light or filtered-tungsten-light and the radiation emitted from sample and reference standard is directed by the same optical means and the switching mirror into the monochromator from where it falls on the photoelectric detector.

As already mentioned, the mirror drive has to overcome high inertial forces during switching the system from one position to the other and it is a further aim of this invention to describe technical solutions for this important device.

Figure 2:
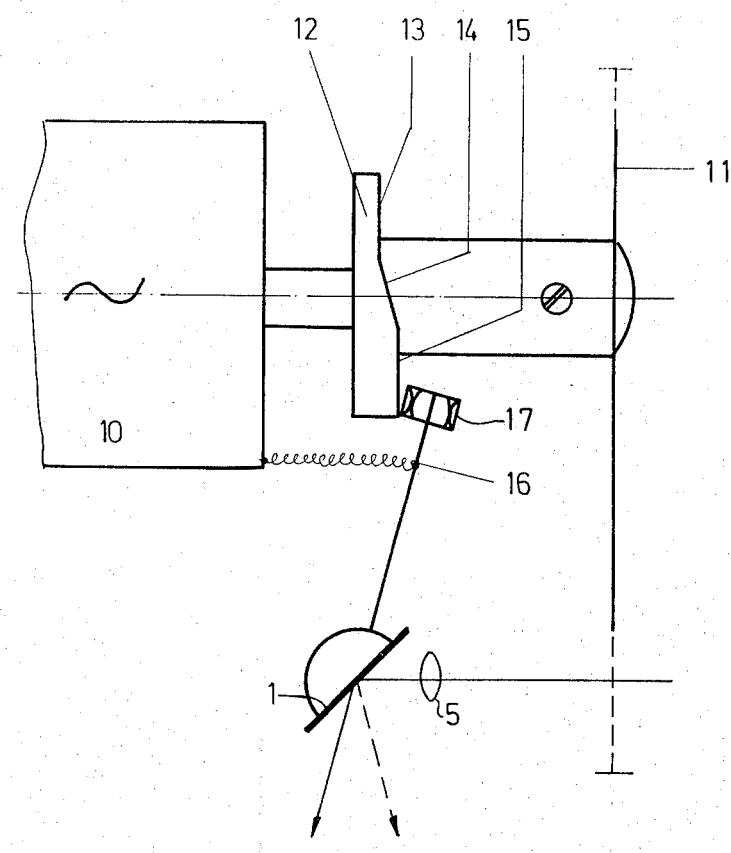
FIG. 2 is a view of a mechanical outlay of the mirror drive actuated by a small motor especially a synchron motor which is furthermore used to drive the rotating shutter.

In FIG. 2 is shown a purely mechanical device actuated from the shutter motor (10) by means of a rotating disc (12), one side plane the other of different elevation (13, 15) on the opposite halves, the regions connected by slopes (14) with rounded edges. A roller bearing (17), mounted on the tip of a lever-arm (16), loaded by a spring, rolls on said racetrack and changes its position twice per each revolution when rolling over the slopes.

The other end of said lever-arm is connected to a shaft that bears the mirror (1) thus coming to a rest at its angular elongations and then directing the common beam in sample or reference path, whereby switching from one path to the other is effected during running over the slopes and phased with the cut-out of the shutter disc (11). The back-driving force of the spring must be strong enough to avoid lifting of the rollerbearing during the times of negative acceleration. In case of synchronous operation, which is preferred, the use of a synchronous motor is very convenient, but of course, the invention is not restricted to this operation mode.

Referring to FIG. 3 an electrical mirror drive is shown that consists of a moving-coil meter (18) that is tuned to a low resonance frequency compared to the beam switching frequency. In order to get short switching times it is essential to provide current pulses for first accelerating the system, which have to be followed by decelerating pulses to avoid over-shooting. In the shown manifestation of the invention, mechanical stops (19) have been provided at both angular deviation elongations to bring the coil to a rest, and small additional currents are used during the lightphases, resulting in a small force, pushing the coil against the stops.

In this case it is not necessary that said currents are constant, for the sake of simplicity, A.C. current pulses of suitable proper convenient polarity can be used instead.

As beforementioned, a preferred operating mode of the invention is synchronous to the line frequency and the electronic circuit in FIG. 3 is shown for this case. The upper half of the secondary winding of transformer (20) is used to provide the holding currents in the working phases which are adjusted by resistor (28) to a proper amount. The accelerating and decelerating pulses are delivered by the complementary transistors (21, 22), two inserted diodes (27) are used to separate the current paths.

A pulse forming network consisting of diodes, resistors and zener diodes (23, 24) feeds in the bases of transistors (25, 26), the collectors of them are connected with the bases of the transistors (21, 22), which deliver the accelerating and decelerating pulses. By means of this circuit, transistors (21, 22) conduct just near the zero crossing points of the line and these are just the moments where the beam switching from one light path to the other has to be made.

In this manifestion of the invention, it is also possible to omit the mechanical stops. Instead, it will be necessary to replace resistor 28 by an electronic circuit, delivering constant and adjustable currents during the working phases of the mirror drive.

Another modification of the invention is shown in FIG. 4, where the mirror is driven by a moving-magnet meter, tuned to a rather high resonance frequency by providing a strong backdriving torque. In this case it is also necessary to impart to the system high current pulses for acceleration at the beginning of the beam switching times. On the other hand, no decelerating current pulses are necessary as the accelerating momentum is used up to load the backdriving spring.

In the electronic circuit, transistors (34, 35) are used as switches, to provide alternatively conducting current paths from a common D.C. source over resistors (36, 37), coils (30, 31) on the pole-pieces (29) of the moving-magnet system to ground. The switching conditions of transistors (34, 35) are controlled by the secondary windings of a transformer (38) by means of a pulse forming network consisting of diodes, Zener diodes and resistors, delivering nearly rectangular half-waves to the bases of said transistors. A phase shifting network (39) is used for proper phasing the switching of said transistors in order to maintain the proper relation of the beam switching intervals relative to the line frequency.

The accelerating pulses are delivered by capacitors (32, 33) which are charged alternatively during the nonconducting periods to the potential of the D.C. source when the transistors are switched on, current pulses are delivered by the charged capacitors, and after discharge, there flows a steady state current, the amount of which and thereby controlling the angular displacement of the system, is defined and can be adjusted by resistors (36, 37).

The mirror, not shown here, is mounted on a shaft, that is actuated by the small permanent magnet (28).

FIG. 5 discloses a mirror drive system, that uses a moving-coil meter tuned to a high frequency relative to that of the beam switching by a strong backdriving spring, not shown here. The outlay of the electronic circuit follows the principles as disclosed in the foregoing section differing only in the fact that this example is confined to an instrument with one coil (40) only. In this case it is necessary to provide currents of different polarity for the two beams that are delivered by two D.C. sources, one positive (41) and the other negative (42). In both current paths capacitors (43, 44) have to be inserted that are alternatively charged and deliver the current-pulses needed for short beam switching times. As in the case of FIG. 5, decelerating pulses are not necessary, as the pulse momentum is used up to load the backdriving spring.

Complementary transistors (45, 46) are used as switches to provide alternatively conducting current paths including resistors (47, 48) and the meter-coil. The switching conditions of said transistors are controlled by two further transistors (49, 50), the collectors of which are connected to the bases of the beforementioned ones. Bias currents for transistors (49, 50) delivered by transformer (51), proper phasing of which is performed by the phase shifting network (52). Curve shaping is done by circuit (53), consisting of diodes, Zener diodes and resistors, delivering two nearly rectangular halfwaves of different polarity and shifted by 180°.

As in the beforementioned manifestations of the invention, the beam switching mirror is fastened to the moving-coil, the whole mirror drive is very convenient and without problems. Of course in case of nonsynchronous operation, provisions have to be made to deliver electric signals for proper phasing the transistors (49, 50) that are controlling the whole mirror drive system.

It should be understood that the present disclosure is for the purpose of illustration only and that this invention includes all modifications and equivalents which fall within the scope of the appended claims.

What I claim is:

1. A double beam photometer for measuring the reflectance of a sample of material relative to the reflectance of a reference material, said photometer comprising:
    reference and sample cells for holding the reference and sample materials, respectively;
    b. a mirror having a reflective surface and being mounted for motion between first and second positions for directing a beam of radiant energy incident on said reflective surface toward said reference cell when said mirror is in said first position, and toward said sample cell when said mirror is in said second position;
    c. a source for directing said radiant energy beam toward said reflective surface;
    d. power means for moving said mirror between said first and second positions, the dwell time of said mirror in each of said first and second positions being substantially longer than the time required for said mirror to move between said first and second positions;
    e. said radiant energy passing between said mirror and said reference and sample cells along first and second paths, respectively, said first and second paths being defined independently of any further reflecting surfaces; and
    f. a mechanical beam chopper interposed between said source and said mirror for interrupting said radiant energy beam synchronously with said movement of said mirror between said first and second positions for passing the radiant energy beam incident onto said reflective surface during a continuous time period during each of said dwell times.

2. The photometer of claim 1, wherein:
    said synchronism between said beam chopper and said mirror movement is achieved by driving said power means and said beam chopper synchronously with the same alternating electrical line voltage.

3. The photometer of claim 1, wherein said power means comprises:
    a. an electromechanical transducer connected to said mirror; and
    b. a control circuit connected to said transducer, said control circuit causing said transducer to generate an accelerating force for initiating movement of said mirror between said first and second positions, said control circuit further causing said transducer to generate a decelerating force on said mirror when said mirror approaches the termination of motion between said first and second positions.

4. The photometer of claim 3, further comprising:
    a. mechanical stops to define the limits of motion of said mirror between said first and second positions, and
    b. said control circuit causing said transducer to generate a holding force for holding said mirror against one of said stops during each of said dwell times.

5. The photometer of claim 3, wherein:
    said control circuit controls said electromechanical transducer to independently define the limits of motion of said mirror between said first and second positions.

6. The photometer of claim 3, wherein said control circuit further comprises:
    means for causing said transducer to generate a decelerating force on said mirror in response to the energy of motion of said mirror between said first and second positions.

7. A double beam photometer for measuring the reflectance of a sample of material relative to the reflectance of a reference material, said photometer comprising:
    a. reference and sample cells for holding the reference and sample materials, respectively;
    b. a mirror having a reflective surface and being mounted for motion between first and second positions for directing a beam of radiant energy incident on said reflective surface toward said reference cell when said mirror is in said first position, and toward said sample cell when said mirror is in said second position, and
    c. power means for moving said mirror between said first and second position, said power means comprising:
        i. an electromechanical transducer connected to said mirror, and
        ii. a control circuit connected to said transducer, said control circuit causing said transducer to generate an accelerating force for initiating movement of said mirror between said first and second positions, said control circuit further causing said transducer to generate a decelerating force on said mirror when said mirror approaches the termination of motion between said first and second positions.

* * * * *